United States Patent [19]

Mitchell et al.

[11] 3,982,003

[45] Sept. 21, 1976

[54] GELLING AND THICKENING AGENTS

[75] Inventors: John Richard Mitchell, East Leake; Keith Buckley, Melton Mowbray; Ian Edward Burrows, Gaddesby, all of England

[73] Assignee: Mars Limited, London, England

[22] Filed: Apr. 14, 1975

[21] Appl. No.: 568,118

[30] Foreign Application Priority Data

Sept. 4, 1974 United Kingdom............... 38663/74
Oct. 8, 1974 United Kingdom............... 43500/74

[52] U.S. Cl...................................... 426/1; 426/577; 426/407; 426/805; 426/802; 426/129; 426/574; 426/271
[51] Int. Cl.²........................ A23L 1/04; A23K 1/10
[58] Field of Search........... 426/397, 407, 577, 589, 426/1, 2, 646, 129, 574, 616, 802, 805

[56] References Cited
UNITED STATES PATENTS

| | | | |
|---|---|---|---|
| 2,132,065 | 10/1938 | Wilson................................ | 426/577 |
| 2,373,729 | 4/1945 | Willaman............................ | 426/577 |
| 2,452,750 | 11/1948 | Halliday et al...................... | 426/616 |
| 2,938,796 | 5/1960 | Zick.................................... | 426/574 |
| 3,017,273 | 1/1962 | Marvin................................ | 426/407 |
| 3,367,784 | 2/1968 | Waitman et al. .................. | 426/577 |

*Primary Examiner*—Jeanette M. Hunter
*Attorney, Agent, or Firm*—Davis, Hoxie, Faithfull & Hapgood

[57] ABSTRACT

Food products comprising solid foodstuffs and more especially meat, meat by-products or other proteinaceous materials are contained in an aqueous phase of near neutral pH value thickened or gelled by pectic substances having a degree of esterification (methoxylation) of less than 20%. Where a rigid gel is required the pectic substance is preferably reacted with a di- or tri-valent metal ion, notably calcium ion and also with a sequestrant. The pectic substance may be a purified or isolated pectate or a natural pectin source, for example citrus peel, in which the pectic substance has the required low level of esterification, for example by enzymatic or chemical treatment of the natural material. Food products employing the thickener or gelling agent of this invention include canned meat products containing meat or meat by-product pieces in a gel or thickened gravy formed by the pectic substance, meat loaf and similar products in which the gel forms a rigid binder for the meaty material, formed products such as sausage or simulated meat pieces based on vegetable proteins, and semi-moist products based on comminuted meaty materials in which the pectic substance provides a coherent elastic texture.

23 Claims, No Drawings

GELLING AND THICKENING AGENTS

The present invention concerns food compositions and provides products in which nutritious materials, including more especially meat or other proteinaceous materials, are bound together by or contained in a gelled or thickened aqueous phase.

A variety of gelling, binding and thickening agents are used in the food industry, including seaweed extracts, gelatine, modified starches, caseinates, egg albumen, and galactomannan gums, to produce such products as meat loaves, canned hams and pet foods. However, these materials suffer the disadvantage of being derived from raw materials of relatively low availability and in several cases the annual supply is subject to the vagaries of wind and tide. In addition the materials are often expensive, partially as a result of the elaborate purification procedures employed in their manufacture.

In contrast, the raw material sources of pectin are abundantly available since pectic substances are present within the tissues of all green land plants and are currently obtained from a variety of waste product, e.g. citrus pulp and peel and apple pomace.

In particular, citrus peel and similar protopectin bearing sources are available in enormous quantities. For example, in 1972-3 the state of Florida, USA, alone produced some 600,000 tons of dried citrus waste, the majority of which is used as an animal feed. This citrus waste results from the extraction of fruit juice from oranges, lemons and other citrus fruit and consists of the peel and pith of the fruit, which comprises some 40 – 60% of the whole fruit.

Although a small proportion of the peel is dried and employed in the manufacture of high- and low-methoxyl pectins the major part is used as animal feed since no other application has been found for the material. Orange peel, in particular gives problems to the pectin manufacturer in being difficult to filter and in possessing high levels of enzymes which attack the pectin molecule.

Some thirty years ago Wilson (U.S. Pat. No. 2,132,065) disclosed a method of manufacturing a crude alkaline de-esterified pectate pulp but this product does not appear to have found any significant markets and is currently not manufactured.

Pectic substances are complex colloidal carbohydrate derivatives that occur in or are prepared from plants. They consist predominantly of polymers of $\alpha$-D-galacturonic acid, although small amounts of neutral sugars such as rhamnose, xylose and gulose may occur in the main polygalacturonic acid backbone or as side chains. The carboxyl groups of the polymers may be esterified with methyl groups to a greater or lesser extent and unesterified groups may be partly or completely neutralised by one or more bases. The water-insoluble pectic substance that occurs in plants is known as protopectin and on restricted hydrolysis yields pectinic acids, which contain a significant proportion of methyl ester groups, and pectins, which are those water-soluble pectinic acids that are capable of forming gels with sugar and acid under suitable conditions. Pectic acid is the term applied to colloidal polygalacturonic acids that are substantially free from methyl ester groups and are formed by substantially complete hydrolysis of other pectic substances.

The gelling behaviour of pectic substances depends critically on the proportion of the galacturonic acid residues which are methoxylated. In a completely esterified material esterified with methyl groups, i.e. with a degree of esterification (D.E.) of 100%, the methoxyl content by weight is about 15%. Currently available commercial pectins used for gelling applications can be divided into two classes:

1. High methoxyl pectins with a D.E. above 50%, which form gels of the traditional jam type. Pectins of this type will only form gels at pH values below 3.5 and in the presence of substances which are believed to act to dehydrate the pectin molecule. Levels of sugar above 60% are generally employed for this function though the materials such as alcohol or glycerol could be used. High methoxyl pectins are primarily employed as gelling agents in preserves and confectionery foodstuffs.

2. So-called low methoxyl pectins in which usually between 20 and 40 per cent of the galacturonic acid residues are esterified. Pectins of this type can form gels over a wider range of pH values in the absence of sugar but require the presence of divalent alkaline earth ions. They have greatest stability in the pH region 4.0 – 4.5 especially when the pectin gel is subjected to heat treatment (see British Pat. No. 814,549). Low methoxyl pectins have been employed as gelling agents in food products such as dietectic jams and fruit milk desserts. Commercial low methoxyl pectins are generally prepared from high methoxyl pectins either by treatment with acids over a very long period of time or by the action of ammonia in alcoholic systems. In the latter case the resultant pectin product will contain some galacturonic acid residues in which the carboxyl groups have been amidated.

In certain cases it is desired to form gelled or thickened food products at near neutral pH values, which have been subjected to heat treatment in order to achieve pasteurization or sterilization. The texture of the gel required may range from a firm solid jelly to a viscous gravy. Such products will generally consist primarily of meat or fish but may also consist of vegetables or other foods. It has been found that it is not possible to form satisfactory thickened or gelled canned products at such conditions of heat treatment and pH by using either high methoxyl pectins or pectins which have methoxyl contents in the range 20 – 40%. It is believed that one of the reasons for this is that pectins of these types depolymerise at high temperatures and neutral pH values and thereby lose their gelling properties.

We have now found that if pectic substances are employed that have less than 20% of the carboxyl groups methylated, and preferably less than 10%, the molecule appears to have sufficient heat stability to retain its gelling or thickening properties in products at neutral or near neutral pH values after heat treatment. Such substances may therefore be used as gelling or thickening agents or binders in pasteurized, sterilized, canned or otherwise heat-treated food products.

For convenience, pectic substances having a D.E. below 20% will be referred to herein as "pectates", this term thus including not only the ideal case in which substantially no methoxyl groups are present but also pectinates with a D.E. up to 20%. The preparation of pectates by cold alkaline hydrolysis of protopectin has been described by Wilson in U.S. Pat. No. 2,132,065.

Accordingly, this invention provides food compositions comprising edible solid ingredients contained in an aqueous phase, thickened or gelled by a pectic substance having a D.E. below 20%, and preferably below 10%. The invention is particularly valuable in providing for the thickening or gelling of near neutral meat-containing products, namely in the pH range 5–8.5 and more expecially 6.0–7.5. Such compositions are usually heat-pasteurized or sterilized and may be contained in hermetic packages such as cans. They may exhibit the rigidity characteristic of a gel or the viscosity and, usually, pseudoplastic or thixotropic properties required of thickened products, as described hereinafter.

The pectic substances useful for this invention include not only purified or isolated pectates but also crude natural pectin sources, such as apple citrus or sugar beet residues, which have been subjected where necessary to de-esterification, e.g. by alkali or enzymes, to reduce their D.E. to below 20%. Usually, natural pectic substances will have to be deliberately de-esterified, for example by alkaline hydrolysis or by an enzyme such as pectinesterase. However, deliberate de-esterification may not be necessary if a natural protopectin source is used having a D.E. below 20%, for example because the source contains pectinesterase. Moreover, if the source contains such an enzyme the mere act of macerating the source material or adding it to a substantially neutral food composition prior to pasteurization or sterilization may cause a reduction in the D.E. sufficient for the purposes of this invention.

Thus if orange peel is ground to a small particle size, preferably neutralized to pH 7–8 with an alkali such as sodium carbonate, for example over a period of 30 minutes, washed to remove sugars and objectionable soluble compounds and dried, the ground product may be employed as a thickening and gelation agent in canned foods. Since the majority of the orange aromatic constituents and colour lies in the surface layer of the peel (the flavedo) it is desirable when using the processed peel to thicken or gel products such as meat or fish that the flavedo be removed prior to processing, thus leaving the less characteristically flavoured albedo. Shaving techniques for removing the orange flavedo from the crushed orange halves are well reported in the literature.

The reaction mechanisms by which the protopectin in the peel is converted into a gelling agent is not well understood. However, although this invention does not depend on any theory for its performance, one possible explanation is that enzymes liberated during the grinding of the orange peel at least partially demethoxylate the pectin molecule, which is thought to be linked to hemicelluloses and other materials in the protopectin configuration, and that on subsequent heat treatment in the substantially neutral food product further demethoxylation and solubilisation of the pectin occurs. We believe that the resulting pectate then reacts with alkaline earth ions in the food product to form a thickened or gelled system.

It will be appreciated that any hydrolysis or other treatment of the pectic substance should not cause excessive reduction of its molecular weight, since this impairs its gelling and thickening qualities. We believe that if the de-esterification has been accomplished with an enzyme the results characteristic of this invention can be achieved with a higher D.E. than if de-esterification is accomplished by other means, presumably as a result of the sequential nature of this type of hydrolysis as opposed to the random removal of methoxyl groups along the chain when acid or alkali hydrolysis is employed. This is especially noticeable with more severe heat treatments, as in the retorting of canned products, and it may be surmised that the extent of depolymerisation of the pectate under these conditions is less in the case of enzyme de-esterified material.

Determination of the degree of esterification may be carried out by the measurement of the methoxyl content of the material and measurement of its galacturonic acid content. Although a modification of Hinton's saponification procedure is commonly employed to measure methoxyl content of high methoxyl pectins we have found this technique can produce inaccurate results when the samples under examination are crude protopectin sources, presumably as a result of interaction with other component of the source material, such as protein.

We have used both the modified saponification method and a more specific procedure based on gas solid chromatography along the lines suggested by Krop et al (Lebensm. — Wiss.u. Technol, vol. 7, 1974, no. 1). Both methods have produced similar results for crude protopectin sources of low methoxyl content, i.e. the preferred material of the invention.

Modified Saponification Method

A sufficient sample of finely ground dried material usually 2g., to release a maximum of 0.02g methanol) is stirred with 250 ml water and heated on a boiling water bath for 20 minutes with occasional stirring after which the mixture is macerated with a high speed stirrer. The dispersion is cooled to 20°C and neutralised to pH 8.4 using a pH electrode to detect the end point, and N/10 sodium hyroxide to effect the neutralisation. 20.00 ml of N/10 NaOH is then added and, after stirring, allowed to stand for 20 minutes. 20.00 ml N/10 HCl is added and the excess HCl estimated by titration with N/10 sodium hydroxide solution to a pH 8.4 end-point using a pH electrode to detect the end point. Titre = B ml.

$$\% \text{ methoxyl} = \frac{B \times 0.3104}{\text{Weight of sample}}$$

GSC Method:

2 g. of finely ground dried material is stirred with 100 ml water and heated on a boiling water bath for 20 minutes with occasional stirring, after which the mixture is macerated in a high speed stirrer. The dispersion is cooled to 20°C and 20 ml of a 1 N sodium hydroxide solution is added with stirring. After 20 minutes at 20°C, 5 ml of 50% concentrated hydrochloric acid is stirred in and quantitatively made up to 200 ml with distilled water. The dispersion is allowed to stand for 10 minutes for the precipitate to settle.

The methanol content of the supernatant liquid is then determined gas-chromatographically using a similar condition to that described by Krop et al (loc. cit.)

The galacturonic acid content of the sample is measured by repeating the procedure described above up to and including the stage of standing for 20 minutes with 1N sodium hydroxide after which 20 ml of concentrated hydrochloric acid is added with stirring. 800 ml of propan-2-ol is added and the dispersion allowed to stand for 30 minutes.

The precipitated solid is filtered off on a Buchner funnel and washed thoroughly with 60% by volume propan-2-ol in water. The solid is then dispersed in water, 10.0 ml 0.1N sodium hydroxide is added and the solid dispersed using a high speed mixer. The dispersion is titrated to pH 8.4 with 0.1N sodium hydroxide using a pH meter (Titre = A ml).

$$\% \text{ galacturonic acid} = \frac{(A + 10) \times 0.9707}{\text{weight of sample}}$$

$$\% \text{ degree of esterification} = \frac{\% \text{ methoxyl content}}{\% \text{ galacturonic acid content}} \times 625.5$$

Pectates are usually obtained as the alkali metal salt, and it is usually necessary for a salt of a di- or tri-valent metal to be present in the food product along with the pectate if a satisfactory gel is to be obtained. Such metal ions may not be necessary where only a thickening action is required, and addition of such an ion may be avoided where a metal ion is present naturally in the food product or in the pectin source or pectate itself. The preferred metal ion is calcium, and suitable salts for addition to the product include di-calcium phosphate dihydrate, calcium sulphate dihydrate, calcium citrate, calcium lactate and calcium chloride.

We have found it desirable for a sequestrant or chelating agent to be included in the product formulation, particularly where a crude protopectin source is employed, where the pectate is in the form of a di- or tri-valent metal salt or where the product naturally contains high levels of divalent or trivalent metal ions. Suitable sequestrants include sodium tripolyphosphate, sodium hexametaphosphate and trisodium citrate. Such a chelating agent will serve to delay the formation of a gel, permitting easier handling of the cold mix and filling, for example, into cans, and also more rapid heat penetration during pasteurization or sterilization. When meats are present an alkaline chelating will also help to counteract the decrease in pH which has been observed on the addition of di- or tri-valent salts to meats. This development of acid conditions can also be counteracted by the addition of an alkali, such as sodium hydroxide, or an alkaline buffer.

The amount of pectate or crude de-esterified pectin source required to form a thickened or gelled food product may vary widely. When a pure pectate is employed this may be present at from 0.1 to 10% by weight of the food product, but preferably from 0.5 to 2.0%. When a crude de-esterified pectin source is employed the level of such pectin source (on a dry basis) may range from 0.1 to 20% by weight of the food product, but preferably from 0.5% to 3%. The crude de-esterified pectin source should contain more than 5% pectin (and preferably more than 10% pectin) on a dry matter basis.

The crude de-esterified pectin source may be used in the dried form or when, for example, the user site is conveniently close to the processing station, may be used without drying, when the quantities required will depend on the solids content of the crude de-esterified pectin source.

In accordance with the preferred aspect of this invention, we have found that de-esterified citrus peel is surprisingly effective for gelling and thickening. For example, we found that a meat product gelled by means of 1.5% by weight orange peel was firmer than a similar product gelled with 1.0% pure pectate. This was surprising because analysis showed that the orange peel contained only 30% pectin (expressed as galacturonic acid). The orange peel may be subjected to alkaline de-esterification but we have found that this is not an essential step for the purposes of this invention.

The dried processed peel contains some 20 – 45% pectin (expressed as galacturonic acid), depending upon the fruit type, degree of maturity, variety, and other factors, and the remaining dry solids comprise hemi-celluloses, araban and other ballast materials. Recent nutritional thinking tends to the view that such cellulosic materials in the quantities contributed to the diet by such inclusion are distinctly beneficial to health. A further advantage of the use of crude materials such as processed peel in accordance with the invention lies in the low calorific value of this material which, together with its previously described properties, signifies its useful application in slimming and diabetic food stuffs where processed peel may be employed to obtain the required water binding properties in place of calorific water binding agents such as starch.

Whilst a variety of food materials, such as vegetable, fruits or sauces, can be thickened or gelled by the use of pectate or processed protopectin materials it is particularly advantageous in the case of canned meat products where the presence of the insoluble non-pectinaceous materials from the crude material, such as comminuted peel, is masked by the meat fines resulting from the heat coagulation of soluble meat proteins.

A most useful property in certain gelatin systems is that of thermoreversibility. A thermoreversible gel can for present purposes be defined as a gel which has a melting point and setting point within the temperatures encountered in the preparation and utilisation of the gelled system.

It has been found that the melting point and setting point in accordance with the invention of pectate gels can be adjusted by increasing or decreasing the available calcium or other non-toxic di- or tri-valent metal ion content within the food product. The availability of the calcium or other metal to interact with the pectate depends not only on the amount of calcium or other metal present but also on the type of metal salt employed and the type and quantity of sequestrant present in the system.

Thus, at high levels of available calcium, food structures can be formed which are stable to heat processing whilst at lower levels of available calcium thermoreversible gelled or thickened systems can be obtained.

We have also found that a thickened food product, i.e. one in which the aqueous phase has an increased viscosity, can either be produced by the direct use of relatively high levels of crude or pure pectate sources or advantageously by the use of much lower levels of the crude or pure pectate source in the presence of added calcium ions and sequestrant. These lower levels are at such a concentration that a coherent gel structure cannot form but instead viscous and usually pseudo-plastic solutions are produced.

We have further found that if pysllium seed husk or gum is added to food product mixes containing treated orange peel an unexpected synergistic interaction occurs during the heat processing stage and producing in the finished product a firmer, tougher, more elastic gel structure than is obtained with either system separately. Psyllium seed husk and gum is derived from a group of plants belonging to the Plantago genus and is used in various pharmaceutical applications.

Although we have found citrus peel particularly useful in the application described, other sources of protopectin, for example apple or pear pomace, or sugar beet residues, are also useful for the purposes of the invention.

The invention also provides a method of preparing a food composition in which edible solid ingredients are mixed with an aqueous solution of pectate (as hereinbefore defined) and preferably a source of alkaline earth metal ions and also a sequestrant, and the mixture is heat-treated and then allowed to cool, whereupon the aqueous solution is thickened by gelling of the pectate.

This process can be carried out with a variety of foodstuffs and in a variety of circumstances. For example, pectates may be employed in the production of food products in sealed packages or containers, for example cans. Such products include hams, meat loaves and pet foods, notably for dogs and cats, and also food comprising a thickened aqueous medium such as stews and soups. Although depending upon the available calcium content the pectate gel may melt below the temperature of retorting of the cans, the pectate medium retains its gelling properties and sets again on cooling.

Pectates can also be used as binders to provide a firm texture in manufactured products such as sausages and the fillings of meat pies. Such products do not attain as high a temperature as canned foods in processing but are subjected to at least pasteurizing conditions. Pasteurization can be defined as the application of sufficient heat, usually at temperatures below 100°C, to effectively eliminate vegetable bacteria, whilst sterilisation is the application of heat at temperatures above 100°C to effectively eliminate both vegetable bacteria and spores.

Further examples of the use of pectates as binders include the production of simulated meat or formed meat pieces which are capable of retaining their integrity, for example, when included in a canned product. Such products can be prepared by shaping, as by extrusion, a mix of comminuted meats or meat by-products or vegetable protein together with the pectate material and desirable sequestrant. The product may be after-treated in a solution of alkaline earth ions.

Pectates can also be used as binders in semi-moist foods, i.e. those stabilized by the inclusion of sufficient water soluble solutes to reduce the water activity to between 0.65 and 0.85 and including an antimycotic.

The preferred formulations of products incorporating a pectate gel or thickener embodying this invention depend on the particular type of product under consideration.

In the case of canned meat or meat by-products the preferred formulations include (by weight) 20 to 95% meat or meat by-products, 0.1 to 5% pectate (or 0.1 to 10% comminuted citrus peel on a dry basis), 0 to 5% acceptable non-toxic alkaline earth metal compound, 0 to 5% sequestrant and 0 to 50% water (or 50 to 95% moisture content in the product).

In the case of formed meat products, including sausage, prepared by binding together comminuted meats or meat by-products, the preferred formulations include 40 to 95% meat or meat by-products, 0.1 to 5% pectate (or 0.1 to 10% comminuted citrus peel on a dry basis), 0 to 5% acceptable alkaline earth metal compound, 0 to 5% sequestrant and 20 to 50% water (or 50 to 95% moisture content in the product).

In the case of simulated meat pieces produced from non-meat, e.g. vegetable, proteins, the preferred formulations include 5 to 50% vegetable protein, 0.1 to 5% pectate (or 0.1 to 10% comminuted citrus peel on a dry basis) 0 to 5% acceptable alkaline earth metal compound, 0 to 5% sequestrant and 20 to 50% water (or 50 to 95% moisture in the final pieces).

The following are examples of the practice of this invention, as applied in a variety of near neutral products, and demonstrate the stability of the gelling or thickening agent to hot processing. All parts and percentages are by weight unless the context otherwise requires.

EXAMPLE 1

Use of isolated pectate:

5 G. of a commercial preparation of sodium pectate (Sodium Polypectate, Sigma Chemical Company), which had approximately 1% of residual methoxyl groups, were dissolved in 200 ml. water and added to 250 g. of chopped lung pieces. A slurry of 20 g. of dicalcium phosphate dihydrate ($CaHPO_4 2H_2O$) and 5 g. of sodium tripolyphosphate ($Na_5P_3O_{10}$) in 50 ml. water was added with stirring to the lung/polypectate mixture and the fluid mix filled into 1 lb. cans, sealed and sterilized for 1 hour at 20 p.s.i.g. in a steam autoclave.

After being cooled, the cans were opened and the lung pieces were found to be embedded in a firm, clear, coherent jelly. The pH of the product was 6.2.

For the purposes of comparison, the effect of using pectins with a higher methoxyl content was demonstrated by repeating this Example 1 except that the sodium pectate was replaced by a similar weight of pure low methoxyl pectin of D.E. 35% (H.P. Bulmer Ltd.). The sterilized product consisted of cooked lung pieces in a thin, watery liquid and had a pH of 6.1.

When this Example was further repeated using instead of sodium pectate a similar weight of a commercial preparation of low methoxyl pectin amide having a degree of esterification of 20–33% and a degree of amidation of 20–25% (manufactured by Cesalpinia), the sterilized product consisted of cooked lung pieces in a thin watery liquid and had a pH of 6.1.

EXAMPLE 2

5 G. of a commercial preparation of sodium pectate (Sodium Polypectate, Sunkist Growers), which had substantially no methoxyl groups present was dissolved in 150 ml. water and added to 288 g. of a mixture of meat offal pieces normally used in canned dog food. A slurry of 20 g. of dicalcium phosphate and 5 g. of sodium tripolyphosphate in 60 ml. water was added with stirring and the mixture was canned and processed as described in Example 1.

After being cooled the cans were opened, and the product was found to be an integral pack of meat offals surrounded by a clear coherent jelly. The product pH was 6.2.

EXAMPLE 3

Example 1 was repeated except that the 20 g. of dicalcium phosphate was replaced by 5 g. of calcium sulphate dihydrate ($CaSO_4 2H_2O$).

The sterilized product was similar in appearance to that described in Example 1 although the jelly was marginally softer in texture. The product pH was 6.5.

EXAMPLE 4

Example 1 was repeated except that the level of dicalcium phosphate was reduced from 20 g. to 5 g. and the 5 g. of sodium tripolyphosphate was replaced by 0.25 g. of sodium hydroxide.

The sterilized product consisted of lung pieces embedded in a soft, coherent jelly and had a pH of 6.4

EXAMPLE 5

Use of fresh comminuted orange peel:

a. Treated orange peel was prepared as follows:

5.2 Kg South African navel oranges were passed through a scraping machine to remove the flavedo. They were then halved and pressed to remove the juice. The resulting peel (3.45 Kg) was passed through a mincer fitted with a 3/16 inch plate. The ground peel was washed with 2 liters of tap water and pressed in a muslin bag. 4.16 Kg of the washed orange pulp was obtained. The pH of the treated peel was 5.2.

b. Preparation of a gelled meat product:

| Formula | |
|---|---|
| Chopped lung | 150 g. |
| Meat offcuts | 150 g. |
| Water | 37.5 g. |
| Sodium tripolyphosphate | 6.25 g. |
| Calcium sulphate dihydrate (finely ground) | 5.00 g. |
| Treated peel | 150 g. |

The ingredients were mixed in a bowl and sufficient sodium carbonate (ca 0.4 g) was added to bring the pH of the mix to 7.5 and allowed to stand for 2 hours to reduce the D.E. of its pectin content to less than 20%. The mixture was then filled into cans, sealed and sterilized at 24 psi for 50 minutes. After standing overnight the cans were opened and found to contain an integral meat pack comprising meat pieces suspended in a firm, brittle, clear jelly. The product pH was 6.0.

EXAMPLE 6

Use of dried orange peel:

a. The dried pulp was prepared as described in Example 5 except that following washing and pressing the ground peel was dried in a laboratory fluid bed drier at 60°C. Drying proved difficult due to the adhesive nature of the ground peel and it took several hours to dry. The D.E. of the dried peel's pectin content was less than 20%.

b. Preparation of a gelled meat product

| Chopped lung | 15% |
|---|---|
| Simulated meat | 10% |
| Meat offcuts | 22.5% |
| Tripe | 2.5% |
| Ground bone | 5.0% |
| Sodium tripolyphosphate | 1.25% |
| Calcium sulphate dihydrate | 1.0% |
| Treated peel | 3.0% |
| Dye solution | 0.3% |
| Caramel | 0.5% |
| Water | 38.95% |

The ingredients were mixed together, filled into cans, sealed and sterilized in an autoclave at 24 psi for 1 hour. After standing overnight the product was found to consist of a firm meat pack containing pockets of a firm brittle jelly. Little or no orange aroma or taste was evident. The product pH was 5.85.

EXAMPLE 7

Use of alkali-treated orange peel:

a. 11.56 Kg of whole Californian oranges were scraped to remove the flavedo, halved and pressed to remove the fruit juice. The 4.91 Kg peel obtained was passed through a mincer fitted with a 3/16 inch plate, washed with 3 Kg water and pressed.

2.5 Kg water was added to the pressed peel and the pH was adjusted to 8.5 by the addition of 55 g of sodium carbonate. The slurry was allowed to stand at room temperature for 18 hours and then pressed in a muslin bag. The dewatered peel was then dried at 60°C in a fluid bed drier and coarsely ground. The pectin content of the treated peel was 10%. The alkali treatment was found markedly to assist dewatering of the peel.

b. Preparation of a gelled meat product

| Chopped lung | 14.1% | |
|---|---|---|
| Fibrous meat | 7.8% | |
| Simulated meat | 7.0% | |
| Offal meat | 3.9% | |
| Ground bone | 5.7% | |
| Meat offcuts | 12.0% | |
| Tripe | 7.3% | |
| Water | 9.9% | |
| Sodium tripolyphosphate | 1.1% | |
| Calcium sulphate dihydrate | 0.9% | |
| Caramel | 0.4% | |
| Dye solution | 0.3% | |
| Treated peel | 2.7% | Gravy |
| Water | 25.7% | |

The treated peel was mixed thoroughly with the caramel, dye and water and then added to a mix of the other ingredients. After thorough mixing the product was filled into cans, sealed and sterilized at 24 psi for 1 hour. After standing overnight the product was found to consist of an integral, firm meat pack with pockets of clear firm brittle jelly. The product pH was 6.6.

EXAMPLE 8

Use of alkali-treated orange peel with reduced calcium and sequestrant levels:

The dried alkali treated orange peel, described in Example 7, was used in the following meat mix preparation:

| Chopped lung | 20% |
|---|---|
| Simulated meat | 10% |
| Meat offcuts | 20% |
| Tripe | 5% |
| Ground bone | 5% |
| Water | 5% |
| Calcium sulphate 2H$_2$O | 0.25% |
| Treated peel | 2.0% |
| Gravy: | |
| Sodium tripolyphosphate | 0.5% |
| Caramel | 0.5% |
| Dye solution | 0.3% |
| Treated peel | 1.0% |
| Water | 30.45% |

The gravy was prepared by mixing the gravy ingredients, other than the treated peel, together and heating to 90°C and then adding the treated peel with vigorous stirring. After 3 minutes the viscous gravy was added hot to the meat mix and mixed thoroughly. The product mix was filled into cans, sealed and autoclaved at 24 psi for 1 hour. After standing overnight the appearance of the product was found to be similar to that described in Example 7.

EXAMPLE 9

Use of alkali-treated orange peel as a thickener with no added calcium and no sequestrant:

The dried alkali treated orange peel described in Example 7 was used in the following meat mix preparation:

|  |  |
|---|---|
| Chopped lung | 30% |
| Ground meat | 30% |
| Water | 10% |
| Gravy: | |
| Treated peel | 3% |
| Caramel | 0.5% |
| Dyestuff solution | 0.3% |
| Water | 26.2% |

The treated peel was added to the cold water, which contained caramel and dyestuff solution, and after 3 minutes mixing the resulting slurry was mixed with the meats and remaining water. The mix was then filled into cans, sealed and autoclaved at 24 psi for 1 hour. After standing over-night the product was found to be a non-integral pack consisting of swollen meat chunks suspended in a viscous thick glossy gravy. The product pH was 6.3.

EXAMPLE 10

Use of dried alkali-treated orange peel with sequestrant but no added calcium ions:

The dried alkali-treated orange peel described in Example 7 was used to prepare the following meat mix:

|  |  |
|---|---|
| Chopped lung | 30% |
| Ground meat | 30% |
| Water | 20% |
| Treated peel | 2% |
| Gravy mix: | |
| Dried ground orange peel | 1% |
| Sodium tripolyphosphate | 0.25% |
| Caramel | 0.5% |
| Dyestuff | 0.3% |
| Water | 25.95% |

The gravy mix ingredients were mixed and brought to the boil, and then added to the meat mix. After further mixing the mixture was filled into cans, sealed and autoclaved at 24 psi for 1 hour. After standing overnight the product was found to consist of a firm integral meat pack containing pockets of a clear soft brittle jelly particularly on the pack surface. The product pH was 6.5.

EXAMPLE 11

Use of dried, alkali-treated grapefruit peel:

South African grapefruits were halved, squeezed to remove the juice and ground in a mincer fitted with a 3/16 inch plate. The 814 g of ground peel so obtained was washed with tap water and pressed to remove excess water. 500 ml of water was added to form a slurry and its pH was adjusted from 4.6 to 8.5 by the addition of 11 g of sodium carbonate. The slurry was allowed to stand at room temperature for 18 hours and then pressed free of excess liquid, washed once with tap water, re-pressed and then dried in a fluid bed air drier at 60°C. The treated peel, having a pectin content with a D.E. below 20%, was ground to a fine powder and used in the following meat mix:

|  |  |
|---|---|
| Chopped lung | 25% |
| Ground meat | 15% |
| Fibrous meat | 10% |
| Meat offcuts | 10% |
| Water | 10% |
| Sodium tripolyphosphate | 1.25% |
| Calcium sulphate dihydrate | 1.0% |
| Gravy: | |
| Treated peel | 3.0% |
| Caramel | 0.5% |
| Dye solution | 0.3% |
| Water | 23.95% |

The treated peel was dispersed in the cold water containing the caramel and dye solution and this 'gravy' was added to the other meat mix ingredients with thorough mixing. The mix was filled into cans, sealed and autoclaved at 24 psi for 1 hour. After standing overnight, the product was found to consist of a firm, integral pack with a surface layer of a soft, brittle jelly. The product pH was 6.2. The product had a meaty aroma with only slight overtones of grapefruit.

EXAMPLE 12

Dried lemon peel was prepared from South African lemons in the same manner as described for grapefruit in Example 11. A meat product, prepared using the dried lemon peel in the same manner as described in Example 11, was found to consist of a firm, integral meat pack with a surface layer of soft, brittle jelly. The product pH was 6.2 and it had a slight aroma of lemons.

EXAMPLE 13

Use of orange peel with psyllium seed husk

Dried orange peel was prepared as described in Example 6 except that a drying temperature of 90°C was employed. Powdered psyllium seed husk was purchased from a commercial source. These materials were used to prepare the following gelled meat product:

|  |  |
|---|---|
| Meat mix: | |
| Formed meat | 3.7% |
| Textured vegetable protein | 26.3% |
| Ground bone | 9.3% |
| Meat offcuts | 13.8% |
| Tripe | 9.3% |
| Added water | 4.7% |
| Calcium sulphate dihydrate | 0.3% |
| Psyllium seed husk | 0.5% |
| Gravy mix: | |
| Dye solution | 0.5% |
| Caramel | 0.9% |
| Sodium tripolyphosphate | 0.5% |
| Water | 29.1% |
| Treated peel | 1.0% |

The various ingredients of the meat mix were combined together, and the gravy mix after being heated to 95°C was added and mixed in thoroughly. The mixture was filled into cans and sterilized at 24 psi for 1 hour. After cooling and standing overnight the product was found to consist of a rigid meat pack embedded in a firm, tough elastic gel.

The product gel was firmer and tougher than those obtained when using either psyllium seed husk or treated orange peel separately.

EXAMPLE 14 a. Preparation of treated orange peel.

10 Kg of South African Navel oranges were halved, squeezed to remove the juice and then passed through a mincer fitted with a 3/16 inch plate. The ground peel was washed with tap water, pressed, slurried in water and sufficient anhydrous sodium carbonate was added with mixing to raise the pH to 9.0. The slurry was allowed to stand for 18 hours and was then pressed, washed, pressed and roller dried. The roller dried flakes were ground into a fine powder. The yield was 520 g. and the D.E. of the pectin content below 20%.

b. Use in formed meat pieces.
Formulation:

| Treated peel | 1.6% |
|---|---|
| Water | 31.7% |
| Sodium tripolyphosphate | 0.2% |
| Non-fibrous meat offcuts | 63.3% |
| Dye solution | 1.3% |
| Caramel | 1.9% |

The sodium tripolyphosphate, dye and caramel were dissolved in the water which had been raised to boiling point. Treated peel, prepared as at (a) above, was added with vigorous stirring and the solution was intimately mixed with the non-fibrous meat. The mixture was extruded in ball-shaped pieces into a 10% calcium chloride solution and allowed to stand for 4 hours.

The firm pieces were then removed, washed in water and autoclaved in cans at 24 psi for 1 hour in the presence of minced meats.

After being cooled, the contents of the can were examined and the formed meat pieces were found to have the firmness and internal texture of lung.

EXAMPLE 15

Use in simulated meat pieces.

| Formulation | |
|---|---|
| Water | 65.3% |
| Caramel | 2.2% |
| Dye solution | 1.5% |
| Sodium tripolyphosphate | 0.3% |
| Devital wheat gluten | 28.0% |
| Treated peel | 2.6% |

The caramel, dye solution, sodium tripolyphosphate and treated peel (prepared as described in Example 14), was heated in the water to boiling point and the devital wheat gluten was added with vigorous stirring.

The mix was poured into a tray and allowed to cool. After standing for one hour the solidified mass was cut into ¾ inch pieces and processed with gelling agent solution in cans at 24 psi for 1 hour.

After being cooled the simulated meat pieces were found to have retained their shape and to have a firm but rather brittle texture similar to that of cooked kidney.

This example demonstrates the usefulness of treated peel in binding together denatured protein materials, which possess no aggregation properties, into a coherent mass.

EXAMPLE 16

Use in fish/meal loaf product a. Whole Spanish Valencia oranges were scraped to remove the flavedo, halved and pressed to remove the fruit juice. 1 Kg of the albedo obtained was passed through a mincer fitted with a 4 mm plate and mixed with 12 g. of anhydrous sodium carbonate for 30 minutes. The albedo was pressed in a muslin bag and then mixed, for 5 minutes, with an equal weight of water. This was then re-pressed in a muslin bag and after mincing through a 2 mm plate the albedo was dried on a roller drier operating at 80 psi. It was observed that roller dried material was much more bland in flavour and less yellow in colour than hot air dried material. The D.E. of this material was 10%.

b. The treated peel was then used as an alternative gelling agent for comparison with a cereal binder in a fish/meat loaf product.

| Cereal Formulation | |
|---|---|
| Meat byproducts | 92 parts |
| Whitefish | 370 |
| Poultry byproducts | 186 |
| Cereal | 375 |
| Brine | 63 |
| Whole blood | 322 |
| Water | 770 |
| Cod liver oil | 26 |
| Milk protein source | 65 |
| Dye solution | 19 |
| Caramel | 7 |
| Treated Peel Formulation | |
| Meat byproducts | 92 parts |
| Whitefish | 370 |
| Poultry byproducts | 186 |
| Treated peel | 94 |
| Sodium tripolyphosphate | 10 |
| Whole blood | 322 |
| Water | 1051 |
| Codliver oil | 26 |
| Milk protein source | 65 |
| Dye solution | 19 |
| Caramel | 7 |

In each case, the ingredients were mixed together, heated to the boil and held at this temperature for 5 minutes. The mix was filled into cans, which were then seamed and sterilized in an autoclave.

After being cooled the cans were opened and the products compared. The treated peel formulation product was found to be an integral meat loaf pack similar in firmness to the cereal formulation pack but with an improved aroma and appearance.

EXAMPLE 17

This example is intended to demonstrate the relationship between the degree of esterification of treated peel samples and their ability to produce thickened gravies after heat sterilisation. Three samples of treated orange peel were prepared as described in Example 16 except that in the first sample no sodium carbonate was added, in the second 10 g. sodium carbonate was added and in the third 15 g. sodium carbonate was added to the orange albedo after mincing.

The degree of esterification of the three samples was determined as previously described and the following results obtained:

| Sample | Degree of Esterification |
|---|---|
| 1 | 56 |
| 2 | 15 |
| 3 | 11 |

Product Preparation

Oven baked, formed meat chunks were prepared from meat offals and binding agents according to formulations and procedures commonly employed in the food industry. Three gravies were prepared using the 3 treated peel samples by heating to the boil the ingredients of the following formulation:

| | | |
|---|---|---|
| Treated peel | 0.7 | parts |
| Caramel | 1.6 | |
| Dye solution | 1.1 | |
| Sodium tripoly-phosphate | 0.5 | |
| Water | 96.1 | |

45 parts by weight of the formed meat chunks and 55 parts by weight of the appropriate gravy were mixed together, filled into cans, seamed and sterilized in an autoclave. After cooling and opening the products were examined subjectively and in addition objective viscosity measurements were made on the product gravies.

| Sample | Appearance | Viscosity by Brookfield Viscometer LVT model spindle 2 speed 12 |
|---|---|---|
| 1 | Formed meat chunks in a large volume of watery brown liquid | 100 cps |
| 2 | Formed meat chunks in a moderate volume of viscous brown liquid | 1225 cps |
| 3 | Formed meat chunks in a low volume of very viscous brown liquid | 1750 cps |

EXAMPLE 18 use in gelled meat products

The three samples of treated orange peel described in Example 17 were used to compare their ability in the preparation of gelled meat products.

| | | |
|---|---|---|
| Product Formula | | |
| Formed meats | 26.2 | parts |
| Textured vegetable protein | 2.4 | |
| Tripe | 8.5 | |
| Beef offal | 19.3 | |
| Ground bone | 4.5 | |
| Water | 7.1 | |
| Gravy | 31.7 | |
| Gravy Formula | | |
| Treated peel | 4.7 | parts |
| Sodium tripolyphosphate | 1.6 | |
| Dye solution | 0.8 | |
| Caramel | 1.1 | |
| Water | 90.6 | |
| Calcium hydroxide | 0.3 | |
| Potassium chloride | 1.0 | |

The gravy ingredients were mixed together and heated to the boil. The appropriate quantity was then mixed with the other ingredients and the mixture filled into cans, seamed and sterilized in an autoclave. After being cooled the cans were opened and the appearance noted:

| Sample | Product Appearance |
|---|---|
| 1 | Very soft pack, collapsing on removal from the can, consisting of meat pieces in a thin watery gravy. |
| 2 | Firm integral pack with a clear glossy firm gel. |
| 3 | Similar to Sample 2 except that the gel was slightly firmer. |

EXAMPLE 19

Use in sausages

Beef sausages were prepared using a conventional rusk component and also with this component replaced with a solution of treated peel (Sample 2 in Example 17) and sodium tripolyphosphate according to the formulations given below:

| | Standard | Treated Peel |
|---|---|---|
| Beef flank | 56.25% | 56.25% |
| Water | 25.0% | 39.34% |
| Rusk | 18.75% | — |
| Treated peel | — | 1.47% |
| Sodium tripolyphosphate | — | 2.94% |
| Seasoning | To taste | To taste |

In order to prepare the sausages the beef flank was coarsely minced before bowl chopping, in the standard example, with the water and rusk to a coarse paste. In the treated peel example the treated peel and sodium tripolyphosphate was heated in the water to the boiling point and then cooled to room temperature, before bowl chopping with the meat to a coarse paste. The mixes were stuffed into a sausage skin and links prepared.

After frying in fat for the same temperature and time it was found that the treated peel sausages were firmer, juicier and had much more meat flavour than the standard rusk sausages.

EXAMPLE 20

Use in Semi-Moist Dog Food Formulation

| | | |
|---|---|---|
| A: | Meat offcuts | 25.8% |
| | Sugar | 31.0% |
| | Water | 12.6% |
| | Glycerol monostearate | 0.4% |
| | Beef fat | 6.4% |
| | Citric acid | 0.2% |
| | Butylated hydroxyanisole | 0.02% |
| | Propylene glycol | 3.9% |
| | Dye solution | 0.1% |
| B: | Treated peel as Example 14 | 12.9% |
| | Sodium tripolyphosphate | 1.3% |
| | Dicalcium phosphate | 3.6% |
| | Potassium sorbate | 0.4% |
| | Vitamin supplement | 1.3% |

The ingredients of the 'A' mix were mixed together and heated to boiling point. After boiling for 10 minutes the mix weight was adjusted to the original weight by the addition of boiling water and the mixed ingredients of the 'B' mix were added with vigorous stirring. The entire mixture was then placed in a tray, allowed to cool, cut into chunks and sealed into plastic bags.

The product had a pH of 6.5 and a firm, chewey texture and a pleasant meaty flavour without the usual unpleasant soya aroma and taste which are present when in conventional products soya grits and flour are used to achieve the binding effect.

We claim:

1. A food product comprising solid foodstuff and an aqueous phase, the aqueous phase having a pH value in the range 5 to 8.5 and being thickened or gelled by a deesterified natural pectin source material containing at least 5% pectic substance having a degree of esterification below 20%.

2. A food product according to claim 1 wherein said aqueous phase has a pH value in the range 6.0 to 7.5.

3. A food product according to claim 1 wherein said pectic substance has a degree of esterification below 10%.

4. A food product according to claim 1 wherein said natural pectin source is citrus peel.

5. A food product according to claim 1 wherein said aqueous phase is thickened or gelled by the reaction product of said pectic substance with at least one non-toxic di- or tri-valent metal ion.

6. A food product according to claim 1 wherein said aqueous phase also contains a Plantago plant product selected from psyllium seed husk ang gum.

7. A food product according to claim 1 containing from 0.1 to 20% of the natural pectin source by weight of the product.

8. A food product according to claim 1 which has been pasteurized or sterilized.

9. A food product according to claim 1 wherein said food product comprises by weight: 40 to 95% comminuted animal protein material, 0.1 to 10% comminuted citrus peel, 0 to 5% non-toxic alkaline earth metal compound and 0 to 5% sequestrant and having a moisture content of 50 to 95%, the pectic substance of said peel forming with said moisture a gel bonding together said comminuted protein material into a coherent mass.

10. A canned food product comprising solid foodstuff including meats or meat by-products, an aqueous phase having a pH value in the range 5 to 8.5, and a quantity of a deesterified natural pectin source containing pectic substance having a degree of esterification below 20%, said pectic substance conferring on said aqueous phase when cold a gelled or thickened quality.

11. A food product according to claim 8 wherein said food product comprises by weight: 20 to 95% animal protein material, 0.1 to 10% comminuted citrus peel, 0 to 5% non-toxic alkaline earth metal compound and 0 to 5% sequestrant, and having a moisture content of 50 to 95%.

12. A food product according to claim 1 wherein said food product comprises by weight: 5 to 50% vegetable protein, 0.1 to 10% comminuted citrus peel, 0 to 5% non-toxic alkaline earth metal compound and 0 to 5% sequestrant and having a moisture content of 50 to 95%, the pectic substance of said peel forming with said moisture a gel bonding together said vegetable protein into coherent formed pieces.

13. A food product according to claim 1 wherein said food product includes water soluble solutes and an antimycotic, said food product being stabilized by the inclusion of sufficient of said water soluble solutes to reduce its water activity to between 0.65 and 0.85.

14. A method of making a food product comprising the steps of:

dissolving a natural deesterified pectin source containing at least 5% pectic substance having a degree of esterification below 20%
in an aqueous phase to confer on said aqueous phase when cold a gelled or thickened quality;
preparing a mix including solid foodstuff and said aqueous phase; and
cooling said mix to obtain a food product having a pH value in the range 5 to 8.5.

15. A method according to claim 14 including the additional step of causing said pectic substance to react with at least one non-toxic divalent or trivalent metal ion contained in said foodstuff, aqueous phase or pectin source whereby to form a gel in said aqueous phase.

16. A method according to claim 15 including the additional step of dissolving a non-toxic divalent or trivalent metal compound and a sequestrant in said aqueous phase.

17. A method according to claim 14 further including the steps of: heat treating said product containing said mix and said pectic substance; and allowing said product to cool and set said aqueous phase to a firm gel.

18. A method according to claim 17 wherein said heat treatment comprises sterilizing said product within a sealed container.

19. A method according to claim 14 further including the preliminary steps of: comminuting a natural pectin source; and treating said pectin source to reduce the degree of esterification thereof to below 10%.

20. A method according to claim 19 wherein said natural source comprises citrus peel and the preliminary step further includes substantially removing the flavedo from said peel.

21. A method of making a canned meat product comprising the steps of removing the flavedo from pectincontaining citrus peel; comminuting said peel;
reducing the esterification of said pectin in said comminuted peel to below 20%;
preparing a mix containing meat or meat by-products, an aqueous phase, and said citrus peel containing said pectate;
filling said mix into containers and sealing it therein;
retorting said filled and sealed containers to sterilize the contents thereof;
and cooling said containers and thereby causing said aqueous phase to set to a gel having a pH value between 5 and 8.5.

22. A method according to claim 14 including the additional steps of:
shaping said mix containing said pectic substance;
gelating said shaped mix while maintaining said shape;
and introducing pieces of said shaped gelled mix into containers.

23. A method according to claim 22 wherein said pieces are filled into cans together with ohter foodstuff; sealing said cans; sterilizing said sealed cans; and cooling said sterilized cans whereby the gelled condition of said pieces is restored without substantial impairment of their integrity.

* * * * *

UNITED STATES PATENT AND TRADEMARK OFFICE
CERTIFICATE OF CORRECTION

PATENT NO. : 3,982,003
DATED : September 21, 1976
INVENTOR(S) : John Richard Mitchell et al.

It is certified that error appears in the above-identified patent and that said Letters Patent are hereby corrected as shown below:

Column 4, line 34, "hyroxide" should be --hydroxide--

Column 6, line 27, "gelatin" should be --gelation--

Column 18, line 1, "deesterified" should be before "natural", not after

Column 18, line 56, "ohter" should be --other--

Signed and Sealed this

Fifteenth Day of November 1977

[SEAL]

Attest:

RUTH C. MASON
Attesting Officer

LUTRELLE F. PARKER
Acting Commissioner of Patents and Trademarks